United States Patent [19]
Erickson

[11] Patent Number: 6,000,885
[45] Date of Patent: Dec. 14, 1999

[54] CUTTING INSERT SUITABLE FOR MOUNTING IN DIFFERENT TOOLHOLDER POCKETS AND ASSOCIATED TOOLHOLDER ASSEMBLY

[75] Inventor: Robert A. Erickson, Raleigh, N.C.

[73] Assignee: Kennametal Inc., Latrobe, Pa.

[21] Appl. No.: 09/120,696

[22] Filed: Jul. 22, 1998

[51] Int. Cl.⁶ .................................................. B23B 27/04
[52] U.S. Cl. ........................ 407/113; 407/111; 407/115; 407/117
[58] Field of Search .................................. 407/111, 107, 407/102, 108, 109, 113, 114, 115, 116, 117, 99

[56] References Cited

U.S. PATENT DOCUMENTS

| | | | |
|---|---|---|---|
| 2,870,523 | 1/1959 | Richard | 407/113 X |
| 3,137,918 | 6/1964 | Breuning | 407/109 X |
| 3,475,802 | 11/1969 | Kollar | 29/96 |
| 3,599,303 | 8/1971 | Sletten et al. | 407/117 X |
| 3,754,309 | 8/1973 | Jones et al. | 29/96 R |
| 3,846,882 | 11/1974 | Stein | 29/96 |
| 3,852,859 | 12/1974 | Carpenter | 29/96 |
| 3,887,974 | 6/1975 | Sorice | 29/95 R |
| 3,934,320 | 1/1976 | McCreery | 29/96 |
| 3,938,230 | 2/1976 | Rice | 29/96 |
| 3,940,835 | 3/1976 | Friedline et al. | 29/105 R |
| 4,028,782 | 6/1977 | Stansak | 29/95 R |
| 4,509,886 | 4/1985 | Lindsay | 407/102 |
| 4,669,924 | 6/1987 | Benson | 407/113 |
| 4,834,592 | 5/1989 | Niebauer et al. | 407/114 |
| 4,993,893 | 2/1991 | Niebauer | 407/113 X |
| 5,704,737 | 1/1998 | Alford | 407/116 X |

*Primary Examiner*—Andrea L. Pitts
*Assistant Examiner*—Henry W. H. Tsai
*Attorney, Agent, or Firm*—Larry R. Meenan; John J. Prizzi

[57] ABSTRACT

A cutting insert for mounting on edge in the insert pocket of a toolholder. The cutting insert has a mounting surface parallel to the top surface of the insert and a second mounting surface angled relative to the top surface of the insert so that the insert may be mounted in a toolholder having either of these two surfaces. An insert mounted in a toolholder having an angled bottom surface is secured within the insert pocket with a greater lateral force.

20 Claims, 4 Drawing Sheets

CUTTING INSERT SUITABLE FOR MOUNTING IN DIFFERENT TOOLHOLDER POCKETS AND ASSOCIATED TOOLHOLDER ASSEMBLY

BACKGROUND OF THE INVENTION

1. Field of the Invention

The invention is directed to a cutting insert, especially for use with metalworking operations, having a geometry making it suitable for mounting in different toolholder pockets. The invention is also directed to the combination of such an insert in a toolholder.

2. Description of the Prior Art

Cutting inserts are well-known, and a large percentage of them are of the throw-away design. Such inserts are detachably clamped on a holder and then are discarded when they become dull or chipped. Throw-away inserts are usually indexable and often reversible so that an insert can be provided with at least two cutting edges for selective presentation to the cutting position. The availability of two or more cutting edges on the insert makes it economical to use and is particularly important with respect to throw-away inserts because of the high cost of the materials from which the inserts are produced, especially when the material is, for example, a cemented carbide.

These inserts must be securely and accurately held in place within a toolholder during a cutting operation. This is especially true when the inserts are used with numerically controlled machines which depend for accuracy upon an accurately located and firmly supported insert. When the inserts are relatively large and have a substantial mounting area, it is possible to secure the insert both accurately and firmly within the pocket of a toolholder by providing the insert with a central hole and the toolholder with a pin-type clamping device.

For grooving, cutoff and threading operations, the cutting insert is frequently mounted in the toolholder pocket on its edge, and oftentimes the insert is not large enough to permit a hole in the insert for a pin-type clamp. Under these circumstances, it is necessary to use a top clamp to hold the insert in place. However, such an arrangement may not provide suitable support to the insert for lateral loads that may be applied to the insert during machining operations such as turning or profiling.

A prior art cutting insert and toolholder are shown in FIGS. 1–2. The cutting insert is generally indicated by the reference character 10. The insert 10 comprises an insert body 15 having a first end 20, a second end 25, a first side 30, a second side 35, and top and bottom walls 40 and 45, respectively. At the juncture of the first end 20 and the top wall 40, there is one cutting edge 50. At the juncture of the second end 25 and the bottom wall 45, there is a second cutting edge 55.

A toolholder 100 for use in combination with the insert 10 has a bar-like member 105 adapted for being clamped in a tool support of any suitable type. At one end of the member 105 there is an insert pocket 110 having a bottom wall 115, a side wall 120, and a back wall 125. An undercut 130 is provided at the juncture of the bottom wall 115 and back wall 125 to protect the cutting edges 50, 55 of the insert 10 which are disposed in that region in each clamped position of the insert 10. The bottom wall 115 and the back wall 125 of the insert pocket 110 are at right angles to the side wall 120 and converge with one another in the direction toward the back of the pocket 110. A first groove 60 and a second groove 65 of the insert 10 are adapted for engagement by a nose 135 on one end of a clamping member 140.

Clamping member 140 has a leg 145 adapted for being received in a recess 150 formed in the top of the toolholder 100. A clamp screw 155 extends through a hole in the clamping member 140 between the legs thereof and into a threaded hole 160 provided in the top wall of the toolholder 100.

When the insert 10 is placed in the pocket 110, the clamping member 140 is put in position and screw 155 is tightened so that the insert 10 is pressed firmly against the bottom wall 115 of the pocket 110 while simultaneously being drawn toward the side wall 120 and the back wall 125. The insert is thereby clamped in the pocket 110 in the toolholder 100 and is located by being forced against the side wall 120 and back wall 125 of the pocket 110. A more detailed description of this arrangement is in U.S. Pat. No. 3,754,309 entitled "cutting Insert and Clamping Arrangement Therefor," which patent is assigned to the assignee of the present invention and hereby incorporated by reference.

This configuration provides a stable arrangement for grooving and cutoff operations where the cutting edge is urged against the toolholder pocket in a direction perpendicular to the cutting edge. This arrangement is suitable to withstand a relatively large force F1 (FIG. 1) which may be applied to the cutting edge at the side of the cutting edge closest to the first side 30, forcing the insert against the side wall 120. This arrangement is also suitable for light threading operations in which the cutting edge is urged with a relatively low force F2 (FIG. 1) away from the insert pocket.

However, this arrangement may not be suitable for machining applications which apply a large cutting force F2. Such a force tends to overcome the diagonal retaining force applied by the clamping member 140 and displace the insert 10 along the bottom wall 115 of the insert pocket 110. As a result, while this arrangement is suitable for a large variety of applications, it is not suitable for applications which apply a large lateral load toward the open side of the insert pocket 110.

The arrangement illustrated in FIGS. 1–2 is currently widely used in industry, and an arrangement is desired which would be capable of withstanding not only forces applied in a direction perpendicular to the cutting edge toward the insert pocket but also to withstand forces applied away from the insert pocket. Furthermore, it is desirable to modify the aforementioned insert to provide lateral support but also to ensure such modifications would not affect the capability of that cutting insert 10 to be used in the toolholder 100 illustrated in FIG. 2.

An object of the invention is to firmly hold an insert in a pocket when the insert is positioned on edge in the pocket so the insert may withstand the lateral forces associated with turning and profiling operations as well as the vertical forces associated with grooving, threading and cutoff operations. Another object is to accurately locate an insert when it sits on edge in a pocket.

It is a further object to provide a cutting insert which may accommodate a toolholder having a pocket with a flat floor as well as to accommodate a toolholder having a pocket with an angled floor.

SUMMARY OF THE INVENTION

The invention provides a cutting insert to be secured with a clamp within a pocket of a toolholder comprised of an insert body having first and second sides which are generally parallel to and opposing each other and defining a width therebetween. The insert also has first and second ends between the sides and top and bottom walls between the sides and each intersecting with one end to form two cutting edges. The top wall and the bottom wall are each comprised of a first support surface which is planar, a second support surface recessed within a portion of the first support surface and comprised of a sloped flat extending from the first side to the first support surface at a point spaced from the second side, and a clamping surface comprised of a notch recessed within the first mounting surface and extending from the first side to the second side.

The invention also provides a cutting insert capable of being mounted in different toolholders. One toolholder has a pocket with a flat bottom which is generally used for grooving and threading operations and a separate toolholder has a pocket with an angled bottom which may additionally be used for profiling operations, wherein either toolholder has a clamp for securing the insert within the pocket and wherein the cutting insert is comprised of an insert body having first and second sides which are generally parallel to and opposing each other and defining a width therebetween. The insert also has first and second ends between the sides and top and bottom walls between the sides and with each intersecting with one end to form two cutting edges. The top wall and the bottom wall are each comprised of a first support surface which is planar and may engage the flat bottom of the pocket of one toolholder and a second support surface recessed within a portion of the first support surface and comprised of a sloped flat extending from the first side to the first support surface at a point spaced from the second side. The second support surface may engage the angled bottom of the pocket of another toolholder. The cutting insert also has a clamping surface comprised of a notch recessed within the first mounting surface and extending from the first side to the second side which may be engaged by the toolholder clamp.

The invention also provides a toolholder assembly comprised of a toolholder with a body having a pocket formed therein which has one back wall, one side wall and one bottom wall and is open on the other three sides. The toolholder has a longitudinal mounting axis and the bottom wall along part of its length at a first section opposite the end wall forms an acute angle with the side wall and along part of its length at a second section adjacent the end wall is recessed below the first section. A cutting insert with an insert body has first and second sides which are generally parallel to and opposing each other and defining a width therebetween; first and second ends between the sides; and top and bottom walls between and each intersecting with one end to form two cutting edges. The top wall and the bottom wall are each comprised of a first support surface which is planar, a second support surface recessed within a portion of the first support surface and comprised of a sloped flat extending from the first side to the first support surface at a point spaced from the second side. The cutting insert also has a clamping surface comprised of a notch recessed within the first mounting surface and extending from the first side to the second side. The insert mounts within the toolholder pocket with the second support surface of the insert in engagement with the first section of the toolholder bottom wall for lateral support and the first support surface of the insert extends into the recess at the second section of the bottom wall. A clamp mounted upon the toolholder has a protruding nose which engages the insert clamping surface and urges the insert into the pocket.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 2:
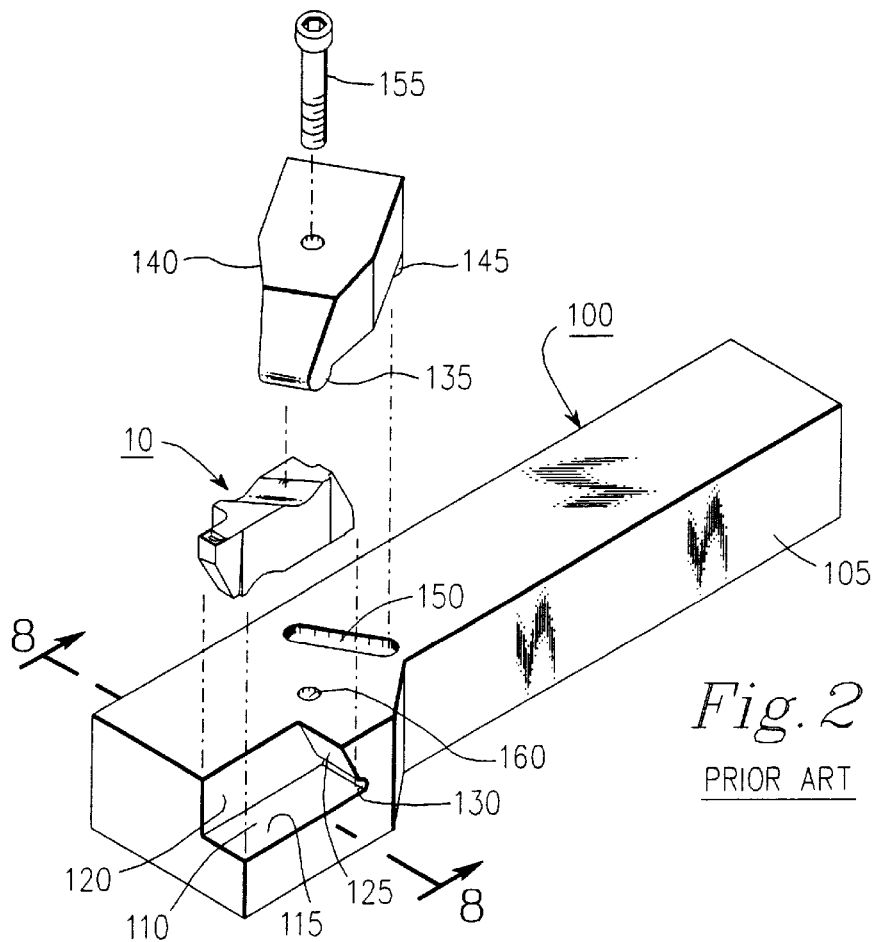
FIG. 2 is prior art and is an exploded perspective view illustrating a typical toolholder and clamping arrangement for use in combination with the cutting insert.
Figure 1:
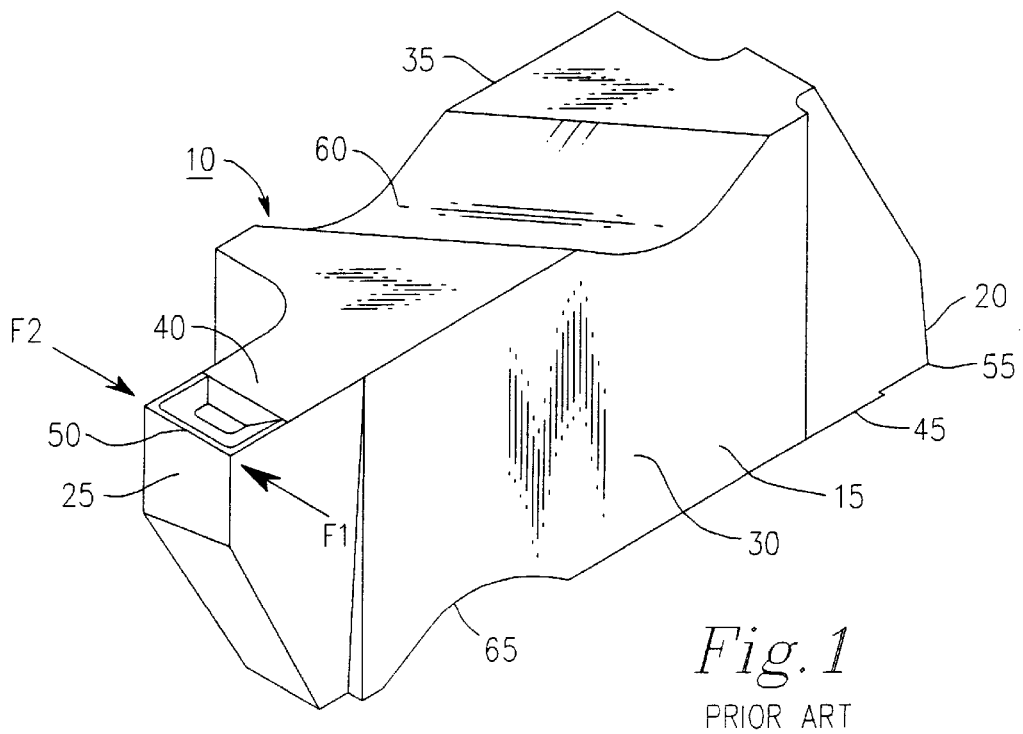
FIG. 1 is prior art and is a perspective view of a cutting insert.

The subject invention involves modifying the prior art insert 10 illustrated in FIGS. 1–2 such that the modified insert is capable of being mounted in at least two different types of toolholders. One toolholder, as illustrated in FIG. 1, has a pocket 110 with a flat floor 115 and is currently a standard design. The other toolholder, as will be discussed in association with FIG. 5, has a pocket with an angled floor which enables the insert to resist both lateral and vertical forces which may be applied during a metalworking operation.

All of the features of the subject invention are similar to those illustrated in FIGS. 1–2 with the exception of the insert pocket details of the toolholder and the angled recess on the insert body.

Figure 3:
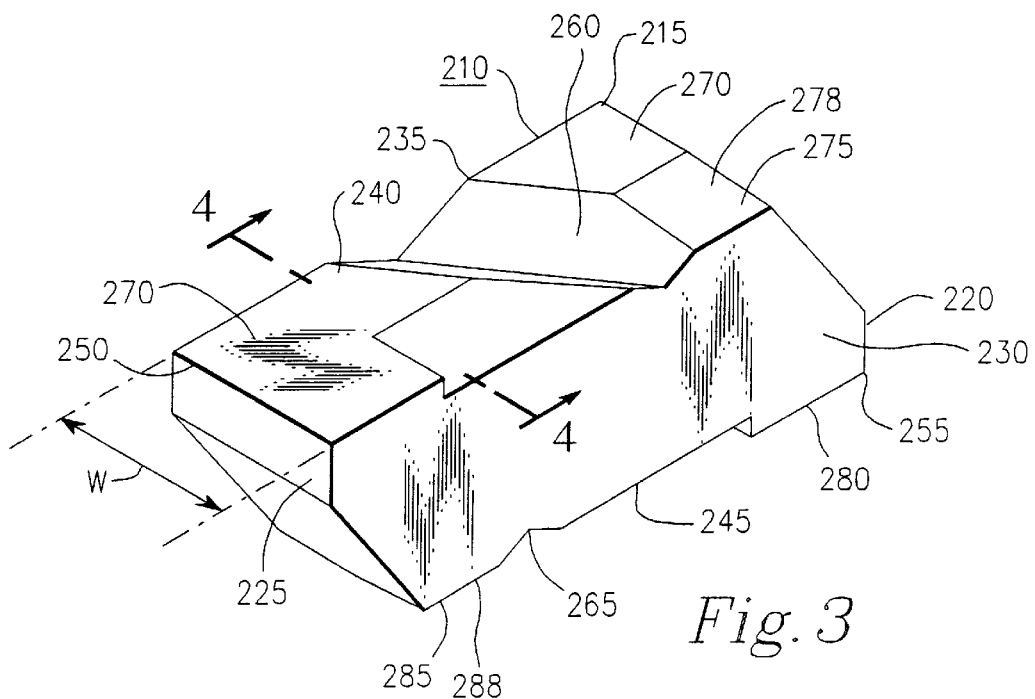
FIG. 3 is an isometric view of a cutting insert configuration in accordance with the present invention.

FIG. 3 illustrates an insert 210 comprising an insert body 215 having a first side 230 and a second side 235 which are generally parallel to and opposing each other and defining a width W therebetween. A first end 220 and a second end 225 are between the first and second sides 230 and 235, respectively. A top wall 240 and a bottom wall 245 are between the first and second sides 230, 235 and intersect with first and second ends 220, 225 to form a first cutting edge 250 and a second cutting edge 255. While illustrated as a straight line, first and second cutting edges 250, 255 may be any configuration suitable for a cutting insert.

The insert body 215 of the insert 210 has a first diagonal groove 260 in the top wall 240 and a second diagonal groove 265 in the bottom wall 245 of the insert 210. Each groove 260 and 265 extends across the insert body 215 to form substantially the same angle with the first side 230 and the second side 235 of the insert body 215. Also, the insert 210 is invertible such that the insert body 215 presents a first end 220 or second end 225 of the insert 210 defining at least in part the first cutting edge 250 or the second cutting edge 255 to a workpiece.

The subject invention differs from the prior art described in FIGS. 1–2 as follows.

Figure 4:
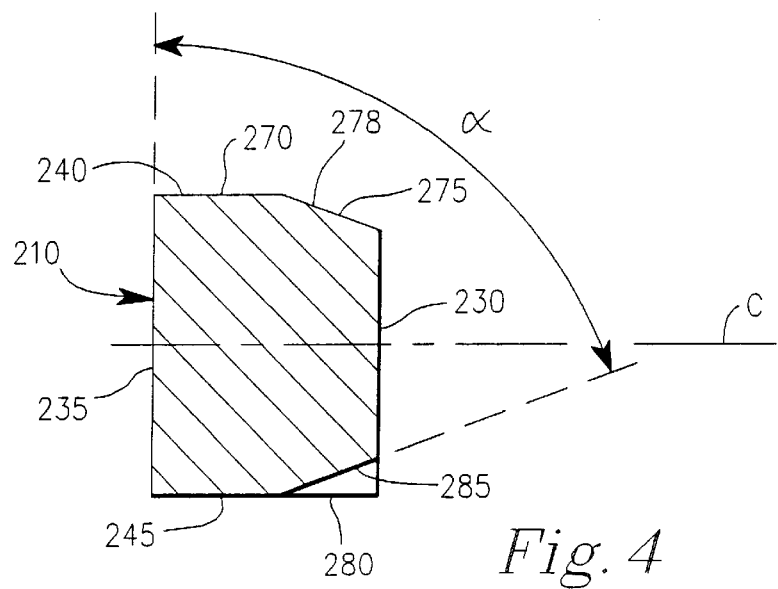
FIG. 4 is a section along arrows 4—4 of FIG. 3.

The top wall 240 is comprised of a first support surface 270 which is planar and a second support surface 275 which may be planar and is recessed within a portion of the first support surface 270 and is comprised of a sloped flat 278 extending from the first side 230 to the first support surface 270 at a point spaced from the second side 235. The bottom wall 245 is identical to the top wall 240 and has a corresponding first support surface 280, a second support surface 285 and a sloped flat 288. The first support surface 270 and the second support surface 275 are a mirror image about centerline C of the first support surface 280 and the second support surface 285, respectively, as illustrated in FIG. 4. The following discussion will be directed to the top portion of the insert 210 but may apply equally to the bottom portion of the insert 210.

Figures 5, 6:
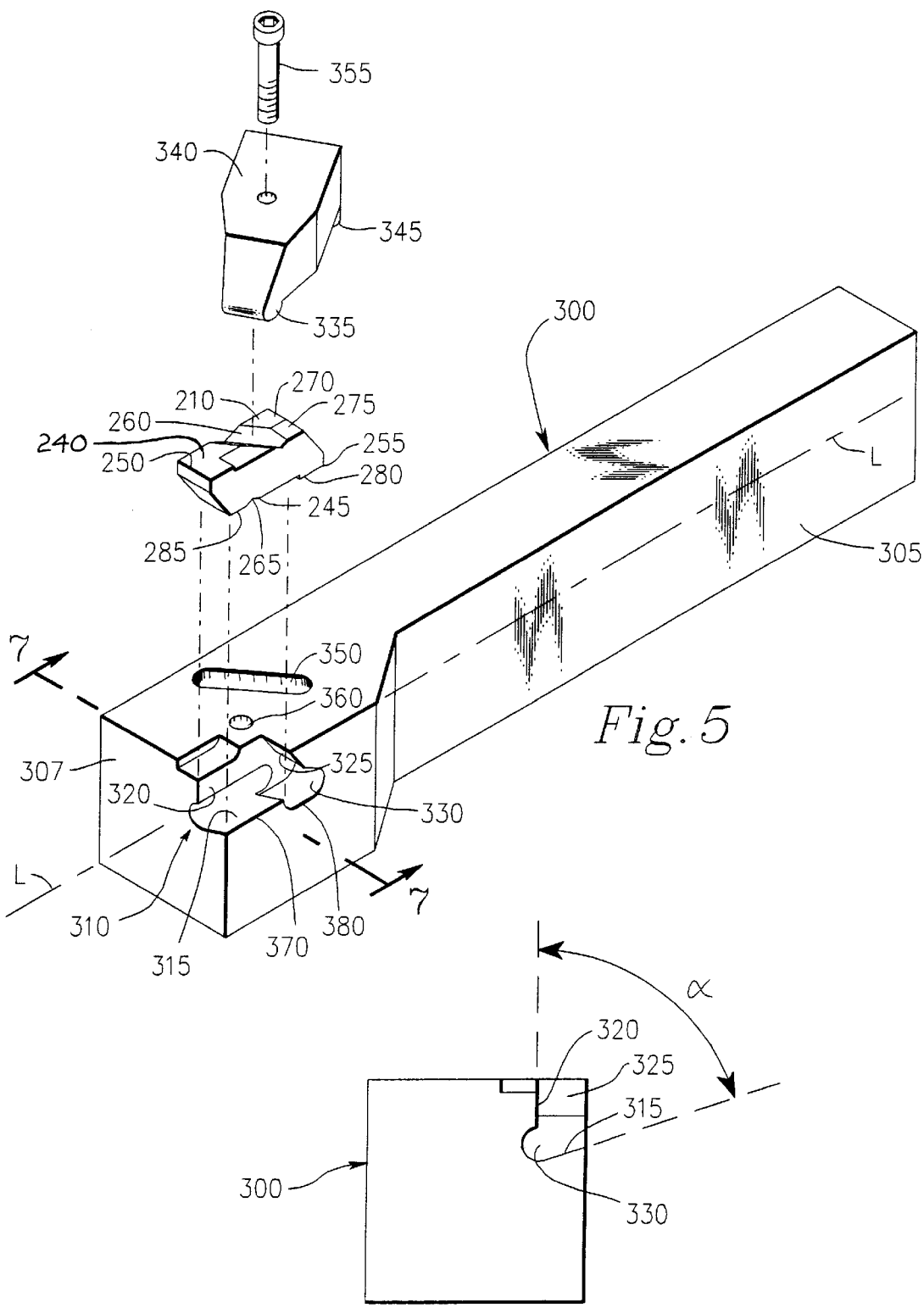
FIG. 5 is an exploded perspective view illustrating a toolholder and clamping arrangement for use in combination with a cutting insert in one embodiment of this invention.
FIG. 6 is an end view of the toolholder illustrated in FIG. 5.

As will be discussed, when the insert 210 (FIG. 3) is mounted within the pocket 110 of a toolholder 100 illustrated in FIG. 1, the first support surface 280 (FIG. 3) associated with the bottom wall 245 is mateable with the floor 115 of the pocket 110. Furthermore, as illustrated in FIG. 5, the same insert 210 is compatible with the pocket 315 of a different toolholder 300. The details of this toolholder 300 are similar to those of toolholder 100 in FIG. 1 with the exception of the details of the insert pocket.

The toolholder 300 in FIG. 5 for use in combination with the insert 210 is a bar-like member 305 adapted for being clamped in a tool support of any suitable type. At one end 307 of the member 305 there is an insert pocket 310 having a bottom wall 315, a side wall 320 and a back wall 325. An undercut 330 is provided at the juncture of the bottom wall 315 and back wall 325 to protect the cutting edges 250, 255 of the insert 210 which are disposed in that region in each clamped position of the insert 210. The back wall 325 of the insert pocket 310 is at a right angle to the side wall 320. A first groove 260 and the second groove 265 of the insert 210 are adapted for engagement by a nose 335 on one end of a clamping member 340.

Clamping member 340 has a leg 345 adapted for being received in a recess 350 formed at the top of the toolholder 300. A clamp screw 355 extends through a hole in the clamping member 340 between the legs thereof and into a threaded hole 360 provided in the top wall of the toolholder 300.

Unlike the bottom wall 115 of the toolholder 100 illustrated in FIG. 1, the bottom wall 315 of the toolholder 300 illustrated in FIGS. 5 and 6 is made up of a first section 370 adjacent to the end 307 of the toolholder 300 and has a surface which forms an acute angle (FIG. 6) of between 65–85 degrees, preferably about 75 degrees, with the side wall 320 to mate with the second support surface 285 (FIG. 5) associated with the bottom wall 245 of insert 210 and has a second section 380 adjacent the back wall 325 with a surface recessed below the first section 370.

Figure 7:
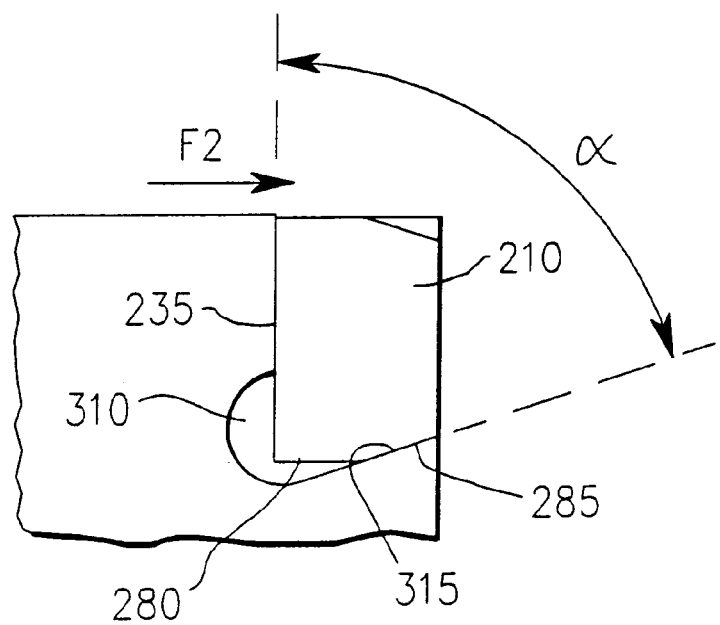
FIG. 7 is a section of the cutting insert along arrows 4—4 of FIG. 3 and a section along arrows 7—7 of the toolholder as shown in FIG. 5.

The insert 210 is mounted in the same fashion as insert 10 previously discussed with the exception that, as illustrated in FIGS. 5 and 7, the second support surface 285 associated with the bottom wall 245 of the insert 210 contacts the angled bottom 315 of the insert pocket 310 to provide lateral support to the insert 210 within the pocket 310. The first support surface 280 is unengaged by the angled bottom 315 of the insert pocket 310. Furthermore, as illustrated in FIG. 5, the second section 380 of the insert pocket 310 provides a recess in which the remaining portion of the first support surface 280 and the inactive cutting edge 255 may be positioned without contacting the insert pocket 310.

When the insert 210 is clamped within the pocket 310 by the clamping member 340, the contact between the second support surface 285 of the insert 210 and the angled bottom 315 of the insert pocket 310 provide lateral support to resist a force on the insert 210, urging it from the pocket 310 or, viewing FIG. 7, a force F2 on the insert 210 pushing it from left to right.

Figure 8:
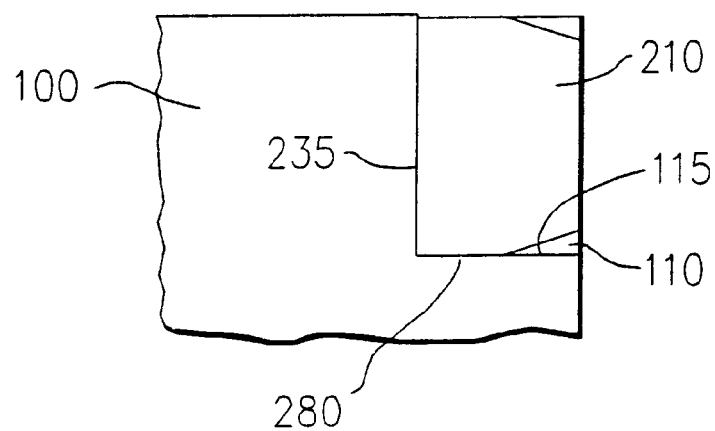
FIG. 8 is a section of the cutting insert along arrows 4—4 of FIG. 3 and a section along arrows 8—8 of the toolholder as shown in FIG. 2.

Although insert 210 has been customized to fit the angled bottom 315 of the insert pocket 310, the insert 210 is still entirely suitable for use with standard toolholders. FIG. 8 illustrates an end view of the toolholder 100 shown in FIG. 2 with insert 210 positioned within the pocket 110. The first support surface 280 of insert 210 is mateable with the flat bottom wall 115 of the standard toolholder 100 illustrated in FIG. 2. Although there is less surface area on the first support surface 280 to contact the bottom wall 115 relative to the surface area available on the bottom wall 45 of the insert 10 in FIG. 1, there is still ample area to provide sufficient support to the insert 210 within the pocket 110 of the toolholder 100. As shown in FIG. 4, the angle the second support surface 285 forms with the second side 235 of insert 210 may be between 65 degrees and 85 degrees and preferably is about 75 degrees. Second support surface 275 forms a similar angle with second side 235 but as a mirror image about centerline C in FIG. 4. The area of projection of the second support surface 285 onto the associated bottom wall 245 of insert 210 is between about 15 to 45% and preferably about 35% of the entire area of the bottom wall 245.

Insert 210 is indexable such that in the indexed position the top wall 240 of the insert 210 will face the floor 315 of the toolholder pocket 310 (FIG. 5) or the floor 115 of the toolholder pocket 110 (FIG. 2). Under these circumstances, the surfaces associated with the top wall 240 will engage the floor of the toolholder pocket in the same fashion as those associated with the bottom wall 245, and the discussion heretofore directed to the surfaces associated with the top wall 240 also applies to the surfaces associated with the bottom wall 245.

What has been described is a cutting insert capable of being mounted within two distinct toolholders, each having different insert pocket details. The present invention may, of course, be carried out in other specific ways other than those herein set forth without departing from the spirit and the essential characteristics of the invention. The present embodiments are therefore to be considered in all respect as illustrative and not restrictive, and all changes coming within the meaning and the equivalency range of the appended claims are intended to be embraced therein.

What is claimed is:

1. A cutting insert to be secured with a clamp within a pocket of a toolholder comprised of an insert body having:
    (a) first and second sides which are generally parallel to and opposing each other and defining a width therebetween;
    (b) first and second ends between the sides;
    (c) top and bottom walls between the sides and each intersecting with one end to form two cutting edges;
    (d) wherein the top wall and the bottom wall are each comprised of:
        i) a first support surface which is planar;
        ii) a second support surface recessed within a portion of the first support surface and comprised of a sloped flat extending from the first side to the first support surface at a point spaced from the second side; and
        iii) a clamping surface comprised of a notch recessed within the top wall and the bottom wall and extending from the first side to the second side across the first support surface and the second support surface.

2. The cutting insert according to claim 1 wherein the second support surface extends from one end of the insert to a point spaced from the other end of the insert.

3. The cutting insert according to claim 2 wherein the area of a projection of the second support surface onto the associated top or bottom wall is between 15 and 45% of the entire area of the wall.

4. The cutting insert according to claim 3 wherein the area of a projection of the second support surface onto the associated top or bottom wall is 35% of the entire area of the wall.

5. The cutting insert according to claim 1 wherein the second support surface forms an angle with the side of the insert of between 65°–85°.

6. The cutting insert according to claim 1 wherein the second support surface forms an angle with the side of the insert of about 75°.

7. The cutting insert according to claim 1 wherein either the top wall or the bottom wall may be positioned uppermost in the toolholder such that the insert is indexable.

8. A cutting insert capable of being mounted within a toolholder having a pocket with a flat bottom which is generally used for grooving and threading operations or within a separate toolholder having a pocket with an angled bottom which may additionally be used for profiling operations, wherein either toolholder has a clamp for securing the insert within the pocket and wherein the cutting insert is comprised of an insert body having:
  a) first and second sides which are generally parallel to and opposing each other and defining a width therebetween;
  b) first and second ends;
  c) top and bottom walls between the sides and each intersecting with one end to form two cutting edges;
  d) wherein the top wall and the bottom wall are each comprised of:
    i) a first support surface which is planar and may engage the flat bottom of the pocket of one toolholder;
    ii) a second support surface recessed within a portion of the first support surface and comprised of a sloped flat extending from the first side to the first support surface at a point spaced from the second side, wherein the second support surface may engage the angled bottom of the pocket of another toolholder; and
    iii) a clamping surface comprised of a notch recessed within the top wall and the bottom wall and extending from the first side to the second side which may be engaged by the toolholder clamp.

9. The cutting insert according to claim 8 wherein the second support surface extends from one end of the insert to a point spaced from the other end of the insert.

10. The cutting insert according to claim 9 wherein the area of a projection of the second support surface onto the associated top or bottom wall is between 15 and 45% of the entire area of the wall.

11. The cutting insert according to claim 10 wherein the area of a projection of the second support surface onto the associated top or bottom wall is 35% of the entire area of the wall.

12. The cutting insert according to claim 8 wherein the second support surface forms an angle with the side of the insert of between 65°–85°.

13. The cutting insert according to claim 8 wherein the second support surface forms an angle with the side of the insert of about 75°.

14. The cutting insert according to claim 8 wherein either the top wall or the bottom wall may be positioned uppermost in the toolholder such that the insert is indexable.

15. A toolholder assembly comprised of:
  a) a toolholder with a body having a pocket formed therein which has one end wall, one side wall and one bottom wall, wherein the toolholder has a longitudinal mounting axis and wherein the bottom wall along part of its length at a first section opposite the end wall forms an acute angle with the side wall and along part of its length at a second section adjacent the end wall is recessed below the first section;
  b) a cutting insert with an insert body having first and second sides which are generally parallel to and opposing each other and defining a width therebetween; first and second ends; top and bottom walls between and each intersecting with one end to form two cutting edges; and wherein the top wall and the bottom wall are each comprised of:
    i) a first support surface which is planar;
    ii) a second support surface recessed within a portion of the first support surface and comprised of a sloped flat extending from the first side to the first support surface at a point spaced from the second side; and
    iii) a clamping surface comprised of a notch recessed within the top wall and the bottom wall and extending from the first side to the second side, wherein the insert mounts within the toolholder pocket with the second support surface of the insert in engagement with the first section of the toolholder bottom wall for lateral support and the first support surface of the insert extending into the recess at the second section of the bottom wall; and
  c) a clamp mounted upon the toolholder having a protruding nose which engages the insert clamping surface and urges the insert into the pocket.

16. The assembly according to claim 15 wherein the second support surface extends from one end of the insert to a point spaced from the other end of the insert.

17. The assembly according to claim 16 wherein the area of a projection of the second support surface onto the associated top or bottom wall is between 15 and 45% of the entire area of the wall.

18. The assembly according to claim 15 wherein the second support surface forms an angle with the side of the insert of between 65°–85°.

19. The assembly according to claim 15 wherein the second support surface forms an angle with the side of the insert of about 75°.

20. The assembly according to claim 15 wherein either the top wall or the bottom wall may be positioned uppermost in the toolholder such that the insert is indexable.

* * * * *